United States Patent
Bulan et al.

(10) Patent No.: US 11,136,677 B2
(45) Date of Patent: Oct. 5, 2021

(54) METHOD FOR MOUNTING OXYGEN-CONSUMING ELECTRODES IN ELECTROCHEMICAL CELLS AND ELECTROCHEMICAL CELLS

(71) Applicants: Covestro Deutschland AG, Leverkusen (DE); Uhdenora S.p.A., Milan (IT)

(72) Inventors: Andreas Bulan, Langenfeld (DE); Michael Großholz, Leverkusen (DE); Randolf Kiefer, Marl (DE); Peter Woltering, Neuenkirchen (DE)

(73) Assignees: Covestro Deutschland AG, Leverkusen (DE); Thyssenkrupp Uhde Chlorine Engineers (Italia) S.R.L., Milan (IT)

( * ) Notice: Subject to any disclaimer, the term of this patent is extended or adjusted under 35 U.S.C. 154(b) by 259 days.

(21) Appl. No.: 15/377,255

(22) Filed: Dec. 13, 2016

(65) Prior Publication Data
US 2017/0088961 A1    Mar. 30, 2017

Related U.S. Application Data

(63) Continuation of application No. 13/992,456, filed as application No. PCT/EP2011/071759 on Dec. 5, 2011, now abandoned.

(30) Foreign Application Priority Data

Dec. 10, 2010    (DE) .................... 10 2010 054 159.1

(51) Int. Cl.
C25D 17/02    (2006.01)
C25B 1/34    (2006.01)
(Continued)

(52) U.S. Cl.
CPC .................. *C25B 1/34* (2013.01); *C25B 9/19* (2021.01); *C25B 11/031* (2021.01);
(Continued)

(58) Field of Classification Search
CPC .............. C25B 9/18; C25B 9/08; C25B 11/02
(Continued)

(56) References Cited

U.S. PATENT DOCUMENTS 4,603,118 A    7/1986 Staab
5,693,202 A    12/1997 Gestermann et al.
(Continued)

FOREIGN PATENT DOCUMENTS

DE    2941774 A1    4/1981
DE    3710168 A1    10/1988
(Continued)

OTHER PUBLICATIONS

International Search Report dated Mar. 14, 2012, dated Mar. 27, 2012.
(Continued)

*Primary Examiner* — Zulmariam Mendez
(74) *Attorney, Agent, or Firm* — Faegre Drinker Biddle & Reath LLP

(57) ABSTRACT

Method for the gastight and liquid-tight installation of oxygen consuming electrodes in an electrolysis apparatus, and electrolysis apparatus for use in chloralkali electrolysis, in which particular regions are covered with an additional film having a composition comparable to the oxygen-consuming electrodes.

21 Claims, 5 Drawing Sheets

(51) Int. Cl.
*C25B 9/19* (2021.01)
*C25B 11/031* (2021.01)
*C25B 11/051* (2021.01)
*H01M 4/88* (2006.01)

(52) U.S. Cl.
CPC ............ *C25B 11/051* (2021.01); *H01M 4/88* (2013.01); *Y10T 29/49108* (2015.01)

(58) Field of Classification Search
USPC .......................................................... 204/258
See application file for complete search history.

(56) References Cited

U.S. PATENT DOCUMENTS

| | | | |
|---|---|---|---|
| 6,218,000 B1 | 4/2001 | Rudolf et al. |
| 6,423,194 B1 | 7/2002 | Furuya |
| 6,660,435 B1 | 12/2003 | Andrieu et al. |
| 7,404,878 B2 | 7/2008 | Katayama et al. |
| 2004/0251128 A1 | 12/2004 | Weuta et al. |
| 2005/0079599 A1 | 4/2005 | Bulan et al. |
| 2005/0173257 A1 | 8/2005 | Bulan et al. |
| 2005/0224341 A1 | 10/2005 | Bulan et al. |
| 2006/0263232 A1 | 11/2006 | Bulan |

FOREIGN PATENT DOCUMENTS

| | | |
|---|---|---|
| DE | 4444114 A1 | 9/1996 |
| DE | 10152792 A1 | 5/2003 |
| DE | 10330232 A1 | 1/2005 |
| DE | 102005023615 A1 | 11/2006 |
| EP | 115845 A2 | 8/1984 |
| EP | 951500 A1 | 10/1999 |
| EP | 1029946 A2 | 8/2000 |
| EP | 1041176 A1 | 10/2000 |
| JP | 2000273677 A | 10/2000 |
| WO | WO-199720881 A1 | 6/1997 |
| WO | WO-200238833 A1 | 5/2002 |
| WO | WO-2003023090 A1 | 3/2003 |

OTHER PUBLICATIONS

English translation of International Search Report dated Mar. 14, 2012, dated Mar. 27, 2012.

METHOD FOR MOUNTING OXYGEN-CONSUMING ELECTRODES IN ELECTROCHEMICAL CELLS AND ELECTROCHEMICAL CELLS

RELATED APPLICATIONS

This is a continuation application of U.S. patent application No. 13/992,456, filed Oct. 3, 2013, which is a national stage application (under 35 U.S.C. § 371) of PCT/EP2011/071759, filed Dec. 5, 2011, which claims benefit of German Application No. 10 2010 054 159.1, filed Dec. 10, 2010.

BACKGROUND OF THE INVENTION

The invention relates to a method of installing an oxygen-consuming electrode in an electrolysis apparatus and an electrolysis apparatus, in particular for use in chloralkali electrolysis, in which regions which are critical in terms of being gastight are covered in a particular way.

The invention starts out from oxygen-consuming electrodes known per se, which are configured as gas diffusion electrodes and usually comprise an electrically conductive support and a gas diffusion layer having a catalytically active component.

Various proposals for operating oxygen-consuming electrodes in electrolysis cells on an industrial scale are known in principle from the prior art. The basic idea here is to replace the hydrogen-evolving cathode of the electrolysis (for example in chloralkali electrolysis) by the oxygen-consuming electrode (cathode). An overview of possible cell designs and solutions may be found in the publication by Moussallem et al. "Chlor-Alkali Electrolysis with Oxygen Depolarized Cathodes: History, Present Status and Future Prospects", J. Appl. Electrochem. 38 (2008) 1177-1194.

The oxygen-consuming electrode, hereinafter also referred to as OCE for short, has to meet a number of requirements in order to be able to be used in industrial electrolysers. Thus, the catalyst and all other materials used have to be chemically stable to sodium hydroxide solution having a concentration of about 32% by weight and to pure oxygen at a temperature of typically 80-90° C. Likewise, a high degree of mechanical stability is required for the electrodes to be installed and operated in electrolysers having a size of usually greater than 2 m$^2$ in area (industrial size). Further properties are: a high electrical conductivity, a low layer thickness, a high internal surface area and a high electrochemical activity of the electrocatalyst. Suitable hydrophobic and hydrophilic pores and an appropriate pore structure for the conduction of gas and electrolyte are likewise necessary, as are freedom from leaks so that gas space and liquid space remain separated from one another. The long-term stability and low production costs are further particular requirements which an industrially usable oxygen-consuming electrode has to meet.

Furthermore, the OCE should be able to be installed in the electrolysis apparatus and replaced in a simple manner. Various methods have been described for installation.

In U.S. Pat. No. 7,404,878, it is stated that, for example, the abutting edges of two OCEs are joined using a layer containing perfluorocarboxylic acid, perfluorosulphonyl fluoride or an alkyl perfluorocarboxylate. The layer subsequently has to be joined to the OCEs by means of a heat treatment. The method is difficult to employ since the OCE can be damaged in the heat treatment. Furthermore, it has the disadvantage that the OCE does not operate in the resulting covered and electrochemically inactive edge and overlapping regions and the remaining area is therefore operated at a higher current density, which leads to an increasing voltage and thus to an overall higher energy consumption.

DE 4444114 A1 describes the installation of an OCE by contacting with the base structure of an electrochemical reaction apparatus by formation of a clamp contact. However, when clamp or press contacts are used, it has been found that the electrical contact resistance thereof frequently deteriorates during the course of operation of the arrangement, which results in an undesirable increase in the consumption of electric energy. A further disadvantage is that the regions of the clamping bars are electrochemically inactive and the OCE area is thus reduced.

A more electrically durable connection between electrodes and electrochemical reaction apparatus can be achieved by means of welding processes, as described in EP 1041176 A1. When a gas diffusion electrode having an unperforated, circumferential, metal margin is used, direct welding to the base structure of the electrode can be carried out. However, the continuous edge mentioned in EP 1041176 A1 of the electrode base structure requires a perforated or slotted metal sheet as support structure. The electrodes to be integrated therefore often consist of a metallically conductive base structure which is open-pored over the entire region and in the voids of which the electrochemically active composition, hereinafter referred to as coating, is embedded. Attempts to weld the coated electrode directly founder on the decomposition of the coating composition which usually takes place at high joining temperatures. To achieve a qualitatively defect-free join, coating composition has to be absent in the welding zone: the open-pored base structure of the electrode is therefore free of coating composition in this region and would allow mixing of the media present on the two sides of the electrode, viz. electrolyte and gas, in the electrochemical reaction apparatus during operation without measures for achieving a sealing action.

To avoid mixing of the media, the uncoated welding zone is provided with liquid or paste-like materials which solidify after some time and seal the open-pored structure at this place at the time of application. Solidification of the sealing materials can, for example, be effected by chemical curing of a liquid or paste-like applied substance. Owing to the usually very chemically aggressive conditions prevailing in the electrochemical reaction apparatus, the operating life of the seals produced in this way has been found to be very short; it varies in the range from weeks to a few months and therefore stands in the way of efficient long-term use of the electrochemical reaction apparatus.

Furthermore, the use of a composition which has become plastic as a result of heating and solidifies again on cooling as sealing material has been described in the literature, see EP 1029946 A2. Although chemically inert substances such as PTFE can be used here, a high temperature has to be employed to achieve permanent bonding of this substance with the base structure; according to the teachings of the patent cited, carrying out the processes accordingly requires complicated apparatuses/machines.

DE 10152792 A1 describes a method of producing a connection between a gas diffusion electrode and the base structure of an electrochemical reaction apparatus, in which separation of the media which are present on the front and rear side of the electrode can be ensured by producing an electrically low-ohm join between the margin of the electrode and a metallic fold-like configuration of a circumferential frame which accommodates the margin and the electrically low-ohm connection of the circumferential frame to the base structure of the electrochemical reaction apparatus. The method according to DE 10152792 A1 is characterized in that the folded part of the frame is made of profiles which are cut in the edge regions for a diagonal joint and are joined to one another by means of laser welding or other welding or soldering processes. An overall disadvantage of the method is that the installation measure is very complicated and costly. Replacement of the OCEs is likewise very complicated and cannot be carried out without an appropriate workshop and tools. A further disadvantage affecting the performance is that the folded regions/profiles are electrochemically inactive and active OCE area is thus lost. The consequence is that the OCE is operated at a higher current density than the counterelectrode (anode), which leads to an increase in the electrolysis voltage and to a deterioration in the economics.

EP 1029946 A2 describes a gas diffusion electrode consisting of a reactive layer and a gas diffusion layer and a collector plate, e.g. a silver mesh. The coating does not completely cover the collector plate but leaves a margin which is free of coating. A thin, frame-like metal plate, preferably of silver, is applied to the gas diffusion electrode in such a way that the metallic frame covers a very small area of the electrochemically active coating and a sealing action is also achieved. The frame projecting beyond the OCE serves to join the OCE to the electrolysis apparatus, for example by means of welding. This contacting is complicated and covers part of the area of the OCE, as a result of which the local current density of the free OCE area increases and the performance of the electrolyser drops because of a higher electrolysis voltage. In addition, the complicated installation results in high manufacturing costs for the electrolyser or high costs for replacing the OCE.

DE 10330232 A1 describes the installation of an OCE, in which the production of an electrical contact between OCE and electrolysis apparatus and establishment of a seal between gas space and electrolyte space are carried out in one operation. Here, a metallic strip is placed both on the coating-free margin of the OCE and on the catalyst-coated region of the OCE and joined to the support structure of the electrolysis apparatus by means of laser welding. This process has the disadvantage that the regions of the metallic strip and also of the weld are electrochemically inactive and that the process selected is very complicated.

Since OCEs are not available in dimensions such that only one OCE has to be installed in each electrolyser apparatus, a plurality of OCEs have to be installed in each electrolysis apparatus. The installation can be effected by slight overlapping of the OCEs or by abutting installation. Even if one OCE per electrolysis apparatus were to be available, regions at which the OCE is creased as a result of installation could be present.

Particular methods for sealing any cracks or holes caused by production or use in OCEs are not known further from the prior art.

It is therefore an object of the invention to provide a novel method for sealing the abutting edges or the regions of overlap or the creased regions of OCEs caused by installation and also methods of sealing any cracks or holes caused by production or use in OCEs. Depending on the construction of an electrolysis apparatus, the OCE sometimes has to be conducted around corners, as a result of which severe mechanical stress acts on the OCE and leaks can occur. As described above, leaks lead to electrolyte being able to get from the electrolyte space into the gas space or gas to get from the gas space into the electrolyte space.

Furthermore, the installation of the OCEs in electrolysis apparatuses in which a gas space is separated from an electrolyte space should be such that gas cannot get from the gas space into the electrolyte space and electrolyte cannot get from the electrolyte space into the gas space. The OCE should be leak-free at a pressure difference between the gas space and the liquid space of 1-170 mbar. Here, leak-free means that no visible exit of gas bubbles into the electrolyte space can be observed. For the present purposes, liquid-tight means that an amount of liquid of not more than 10 $g/(h*cm^2)$ passes through the OCE (where g is the mass of liquid, h is an hour and $cm^2$ is the geometric electrode surface area). However, if too much liquid passes through the OCE, this can flow downward only on the side facing the gas side. This can form a liquid film which prevents entry of gas into the OCE and therefore has an extremely adverse effect on the performance of the OCE (undersupply of oxygen). If too much gas gets into the electrolyte space, the gas bubbles have to be able to be discharged from the electrolyte space. In any case, the gas bubbles blind the electrodes and membrane surface, which leads to a shift in the current density and thus in galvanostatic operation of the cell to a local increase in current density and to an undesirable increase in cell voltage over the cell.

Furthermore, only a very small electrochemically active area of the gas diffusion electrode should be lost as a result of installation and the installation should be able to be carried out technically simply.

SUMMARY OF THE INVENTION

The object has been able, for example, to be achieved by the overlap regions/creased or abutting edges of an OCE being covered during installation with a film comprising a polymeric component and silver oxide.

The invention provides a method for the gastight installation of one or more joining oxygen-consuming electrodes in an electrochemical half cell, characterized in that creased regions and/or cracked regions of the oxygen-consuming electrodes and/or abutting edge regions and/or overlap regions of adjacent oxygen-consuming electrodes occurring when the oxygen-consuming electrodes are brought into juxtaposition with the frame of the gas compartment of the half cell are covered with an additional film, hereinafter also referred to as sealing film, which has a composition comparable to the oxygen-consuming electrodes and is thinner than the layer thickness of the oxygen-consuming electrode.

The novel method can, in particular, be applied to gas diffusion electrodes which contain silver and/or silver oxide as catalytically active component. The invention preferably relates to the installation of gas diffusion electrodes in an electrolysis apparatus in which a gas space is separated from an electrolyte space. In particular, OCEs which are based on silver and whose production is described by way of example in DE 3710168 A1 or EP 115 845 A1 are used. It is likewise possible to use OCEs based on catalysts in which silver is supported on carbon.

DETAILED DESCRIPTION

In a preferred method, the sealing film has the same catalytically active material as the oxygen-consuming electrode.

The sealing film and/or the oxygen-consuming electrodes are preferably based, independently of one another, on a fluorinated or partially fluorinated polymer, in particular polytetrafluoroethylene (PTFE), and a silver-containing catalytically active material.

In a further preferred embodiment of the novel method, the catalytically active component in the sealing film and/or in the oxygen-consuming electrodes comprises, independently, silver, silver(I) oxide or silver(II) oxide or mixtures of silver and silver oxide.

The content of the catalytically active components in the sealing film particularly preferably comprises at least 50% by weight of silver oxide, particularly preferably at least 80% by weight of silver oxide.

A further particularly preferred method according to the invention is characterized in that the sealing film and/or the oxygen-consuming electrodes comprises mixtures which, independently of one another, contain, as catalytically active component, from 70 to 95% by weight of silver oxide, 0-15% by weight of silver metal powder and 3-15% by weight of a fluorinated polymer, in particular PTFE.

The sealing film and the oxygen-consuming electrodes are preferably pressed together after application of the sealing film.

In a variant of the novel method, the sealing film and the oxygen-consuming electrodes join together at their contact points after application of the sealing film when the cell is started up. When carrying out the novel method, the overlap or/and abutting regions and/or creased regions are particularly preferably located at places in the electrolysis apparatus in which the electrolysis apparatus exerts mechanical force on the sealing film described after assembly.

Description of preferred forms of the sealing film suitable for the novel method:

To produce the sealing film, silver oxide having a particle size distribution having a D50 of 1-30 μm is used, but coarser or finer powders can also be used. The polymer used should be chemically stable under the conditions under which the OCE is used. For example, in chloralkali electrolysis, the polymer should be stable to 32% strength by weight NaOH at 90° C. in the presence of pure oxygen. It is possible to use, for example, fluorinated or partially fluorinated polymers such as polytetrafluoroethlyene (PTFE). Furthermore, the polymer should likewise be largely stable to the oxidizing action of silver oxide, in particular under manufacturing conditions.

To produce the sealing film which is preferably used, the polymer component is used in such an amount that a handleable film which can withstand mechanical loads is produced. For the present purposes, able to withstand mechanical loads means that the sealing film can be installed in an industrial electrolysis apparatus without being destroyed, i.e. no creases or ruptures in which the sealing film forms relatively large holes or wide cracks.

To increase the ability to withstand mechanical loads, a woven reinforcing fabric can be incorporated into the sealing film. The woven reinforcing fabric should have some stability to the oxidizing action of silver oxide, i.e. it should survive the manufacturing process through to the finished sealing film without appreciable corrosion or deterioration in the mechanical properties. Chemical resistance of the woven reinforcing fabric under use conditions is not absolutely necessary. It is therefore also possible to use materials which, for example, are not stable to sodium hydroxide, e.g. polyesters. It is possible to use, for example, electrically conductive supports such as mesh, woven fabric, braid, knitteds, nonwoven or foam composed of metal, in particular nickel, silver or mixtures of nickel and silver or else nickel-copper alloys. It is likewise possible to use nonmetallic resistant materials, e.g. materials based on polypropylene, for the woven reinforcing fabric.

The proportion of the polymeric component in the mixture with silver oxide for the sealing film is preferably selected so that electrochemical reduction of the silver oxide in the sealing film can still occur under the conditions of operation of the OCE in the electrolysis apparatus. In a preferred method, the proportion of silver oxide is therefore greater than 50% by weight, particularly preferably greater than 80% by weight. As polymer for the sealing film, particular preference is given to using polytetrafluoroethylene (PTFE).

A sealing film can be produced from the polymeric component and the silver oxide in a manner similar to the methods known in principle from the prior art for producing OCEs. This can, for example, be carried out by means of the following different methods:

One possibility is to extrude the silver oxide and the polymeric component in powder form to produce a film.

It is likewise possible for the silver oxide to be incorporated like a filler into the polymeric component, in the case of PTFE in a manner similar to production of OCEs as described in EP 951500 A1, by paste extrusion to produce a porous sealing film.

It is likewise possible for the silver oxide to be, for example, scattered on a porous PTFE film and subsequently pressed in.

Furthermore, the polymer can be processed in a manner analogous to the mixing process described in DE 2941774 and subsequently calendered or pressed with or without a woven reinforcing fabric to give a film.

According to a process known from EP 115845 A2 for producing OCEs, a silver catalyst can preferably be precipitated onto PTFE. In this case, a reducing agent is added in the precipitation of silver nitrate with sodium hydroxide in order to reduce the resulting silver oxide directly to silver. If the reducing agent is omitted, silver oxide can be precipitated on PTFE. This material can be filtered off, dried and processed by means of a mixing process according to DE 2941774 A1 to give a powder which can then be pressed as described in DE 3710168 A1 or EP 115 845 A2 to give a film.

The specific content of the production processes described in the abovementioned publications is fully incorporated by reference into the disclosure content of the present patent application.

The sealing film particularly preferably comprises from 60 to 99% by weight of silver oxide and from 1 to 40% by weight of PTFE. A silver powder can optionally be added in addition. This should, in particular, have an average particle diameter of less than 50 μm. The amount of additional silver powder is particularly preferably from 0 to 15% by weight.

The thickness of the sealing film which is preferably used in the novel method is from 10 μm to 800 μm, preferably from 50 μm to 600 μm. The sealing film is particularly preferably made thin, i.e. with a thickness of less than 500 μm.

The layer thickness of the oxygen-consuming electrode without sealing film is typically from 0.1 to 0.9 mm, preferably from 0.2 to 0.7 mm.

The invention further provides an electrochemical half cell having one or more adjoining oxygen-consuming electrodes (1, 1a), characterized in that the oxygen-consuming electrodes have creased regions, and/or cracked regions of the oxygen-consuming electrodes and/or abutting edge regions and/or overlap regions of adjacent oxygen-consuming electrodes occurring on installation on the frame of the gas compartment of the cell and these regions are covered with an additional film which has a composition comparable to the oxygen-consuming electrodes and is thinner than the layer thickness of the oxygen-consuming electrode.

A preferred electrochemical cell is characterized in that it contains fluorinated polymers, in particular polytetrafluoroethylene (PTFE), in the gas diffusion layer of the oxygen-consuming electrodes.

A further preferred embodiment of the electrochemical cell has an electrically conductive flexible textile structure, in particular composed of metal threads, preferably composed of nickel and/or silver-coated nickel, as additional support element in the oxygen-consuming electrodes and/or in the film.

If a woven reinforcing fabric is used, this preferably comprises a woven metal fabric, e.g. a nickel mesh, silver mesh or silver-plated nickel mesh, in which the mesh opening is greater than 0.1 mm and the wire thickness is greater than 60 µm. It is likewise possible to use other materials.

The sealing film should have a calculated porosity of 20-70%. The calculated porosity is derived from the ratio of the density of the materials used and the amount present in the finished sealing film and also the density of the sealing film produced (without the woven reinforcing fabric).

The compaction ratio is in the range from 2 to 5, based on the ratio of film density (without woven reinforcing fabric) to the powder bulk density.

Further preference is given to variants of the electrochemical cell which are obtained by installation of oxygen-consuming electrodes according to one of the above-described novel methods.

The invention is illustrated below with the aid of the figures by means of the examples which, however, do not constitute a restriction of the invention.

EXAMPLES

Figure 1:
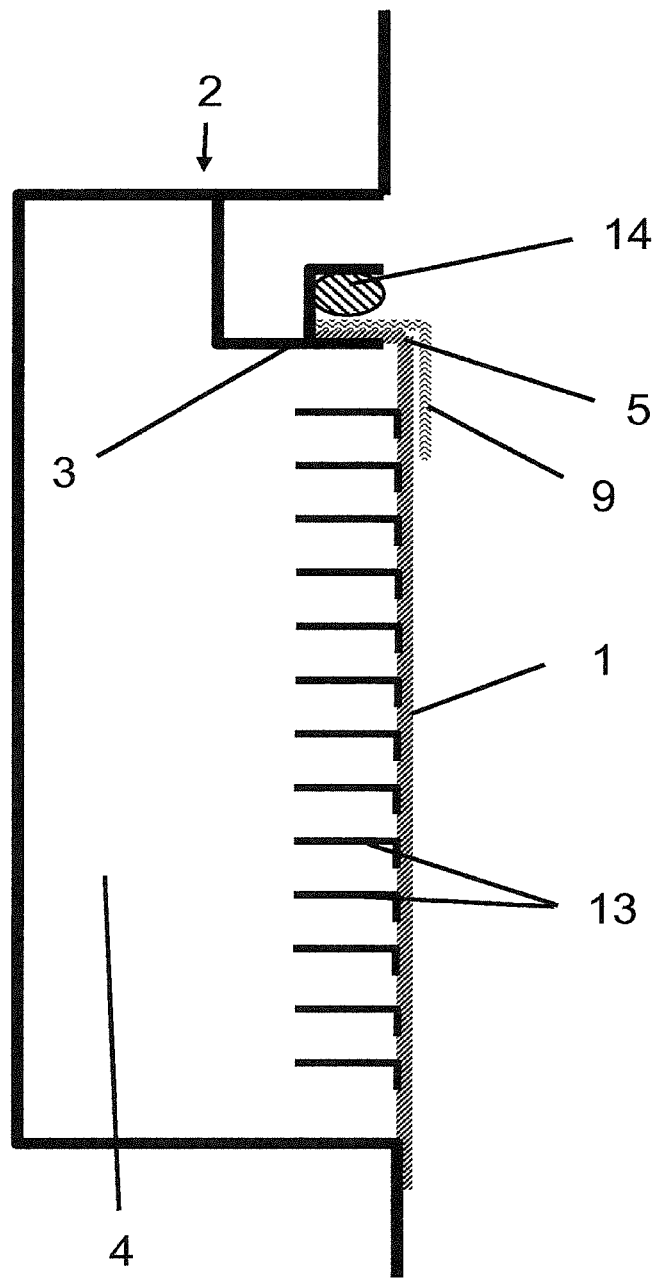
FIG. 1 shows a schematic cross section through an electrochemical half cell 2

Production of the Film 2 kg of a mixture of 88% by weight of silver oxide, 5% by weight of PTFE and 7% by weight of silver powder were intensively mixed in an Eirich RO2 mixer for 5 minutes, the mixture was then allowed to cool to room temperature and was then again intensively mixed for 3 minutes. After cooling to room temperature, the mixture was sprinkled on a woven reinforcing fabric consisting of a woven nickel mesh (wire thickness 0.14 mm, mesh opening 0.5 mm) in such a way that a powder layer having a thickness of 1 mm was formed on the woven reinforcing mesh. This powder layer was compacted with the woven reinforcing fabric by means of a calender. The compaction ratio was 3.4. The thickness of the resulting film 9 was 290 µm, and the calculated porosity was 44%. The film 9 obtained in this way can be produced as a continuous film. Its width is limited by the width of the rollers of the calender. The film 9 can, when used, be cut to size for the appropriate sealing/crease and/or overlap regions.

Figure 2:
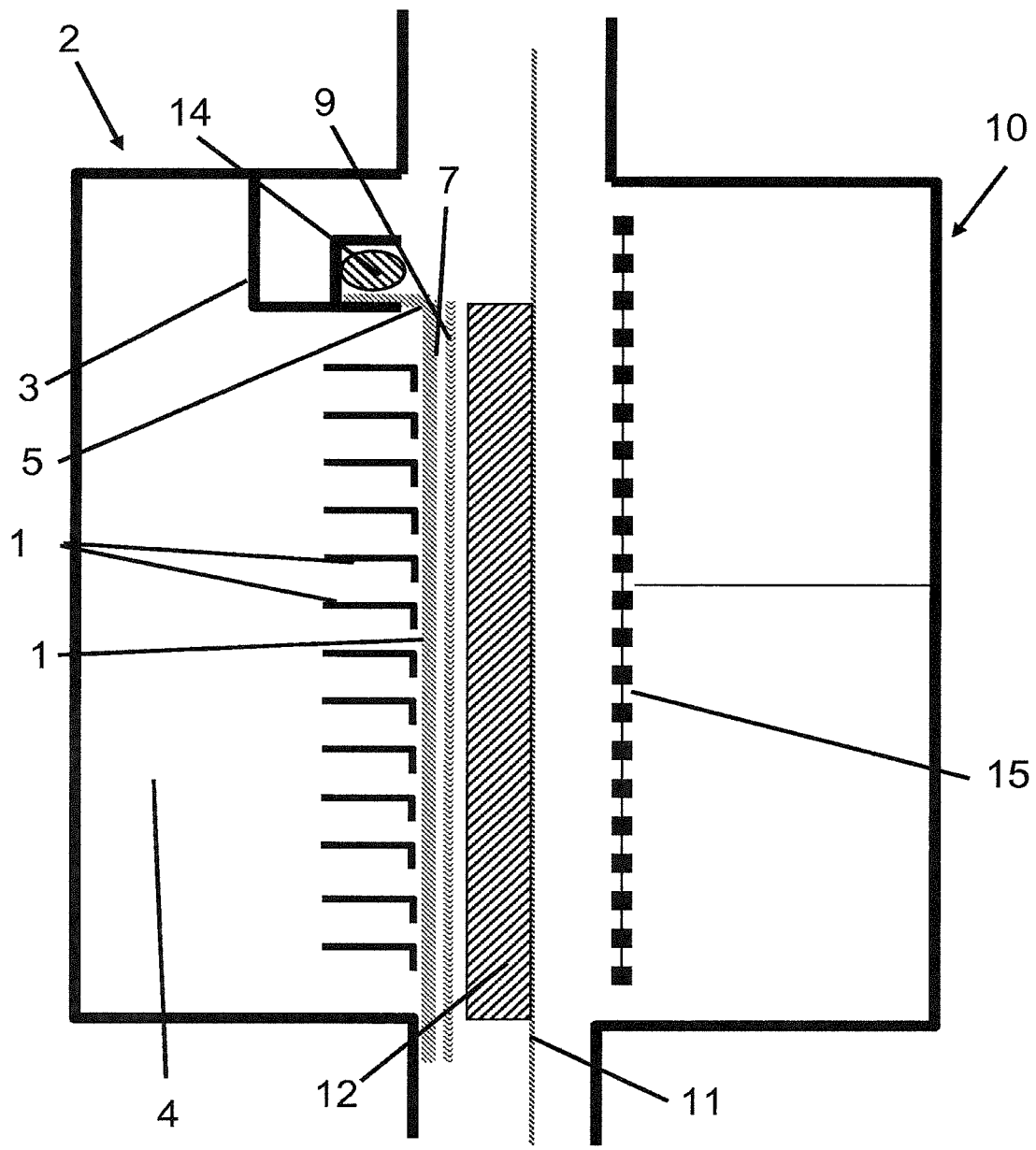
FIG. 2 shows a schematic cross section through a laboratory cell 2, 10 in the half-opened state—depiction of the abutting region 7
Figure 2A:
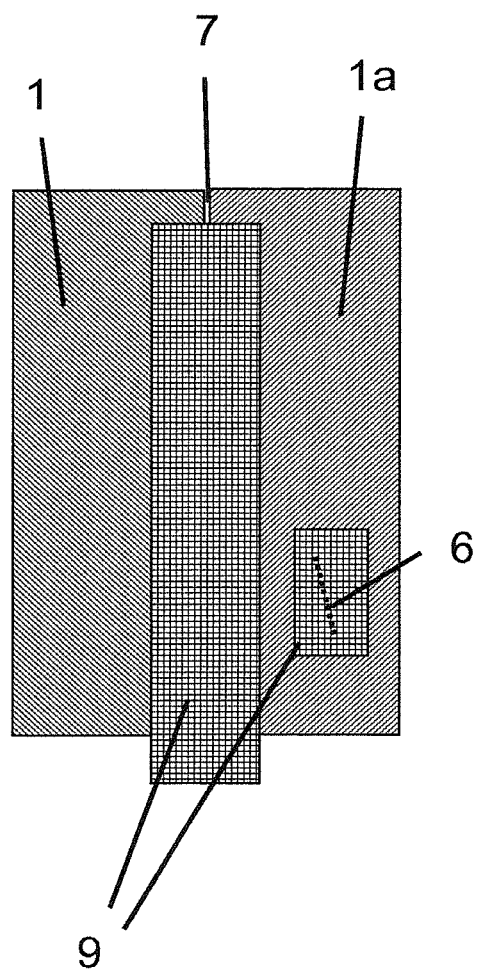
FIG. 2a shows a schematic depiction of the overlap of a sealing film 9 with two oxygen-consuming electrodes 1 and 1a in the region 7 at which the oxygen-consuming electrodes 1 and 1a abut one another and also the overlap of a sealing film 9 with a crack 6 in the oxygen-consuming electrode 1a FIG. 3 shows a schematic cross section through a laboratory cell 2, 10—depiction of the overlap region

Effectiveness Test:

The sealing action of the film 9 was tested in an electrolysis cell. In the cathode half cell 2, power was supplied to the cathode 1, 1a via a support structure 13 (see FIGS. 1 and 2). For this purpose, two silver oxide-based oxygen-consuming cathodes 1 and 1a (OCEs) were placed together so that they abutted and were fixed by means of a sealing profile 14 in a profile edge of the frame 3 (see FIG. 2). The above-described silver oxide-based film 9 was laid over the abutting edge 7 and pressed in such a way that the film 9 overlapped by about 3 mm on each side of the abutting edge 7. FIG. 2a shows, in a schematic side view corresponding to FIG. 2, the position of the film 9 and of the OCEs 1 and 1a in the abutting edge region 7. The anode half cell 10 had an anode 15 made of expanded titanium metal coated with a commercial noble metal oxide-based DSA® coating from Denora. Inflow and discharge of the electrolytes and of the gases are not shown in the figures since they are outside the plane of the section. Since the electrolysis cell was operated as a falling film cell, the cathode inlet is located in the upper part of the half cell and the outlet is located at the lower end of the spacer 12. The electrolysis cell was subsequently assembled and started up. The alkali pressure at the lower edge of the OCE was 20 mbar. The gas pressure (oxygen) in the gas space 4 was 60 mbar. A sodium chloride solution having a sodium chloride content of 210 g/l served as anolyte and a 30% strength sodium hydroxide solution served as catholyte. The temperature of the electrolytes was about 85° C., and the current density was 4 kA/m². An increase in the cell voltage was not observed.

The spacer 12 which keeps the distance between membrane 11 and silver-based OCE 1; 1a constant at 3 mm ran along the abutting edge 7. After start-up, no gas or liquid breakthrough could be observed. The cell voltage of the laboratory cell was unchanged compared to a cell having a continuous oxygen-consuming cathode without abutting edge 7.

Figure 3:
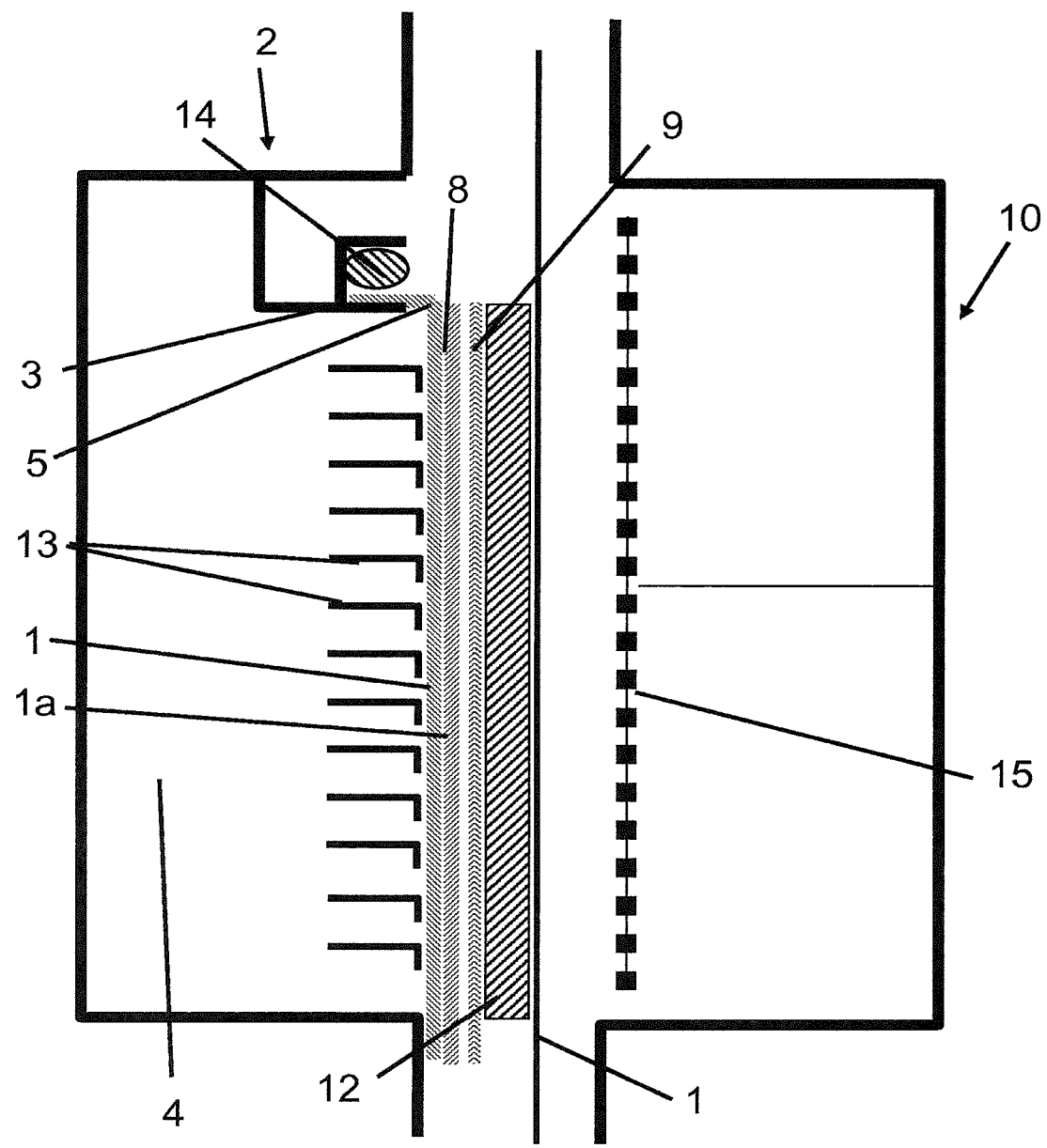
FIG. 3a shows a schematic depiction of the overlap of a sealing film 9 with two oxygen-consuming electrodes 1 and 1a in the region 8 in which the oxygen-consuming electrodes 1 and 1a overlap In the figures, the reference numerals each have the meaning given at right:
1, 1a oxygen-consuming electrodes
2 electrochemical half cell (2)
3 frame (3)
4 gas compartment (4)
5 crease region (5)
6 cracked region (6)
7 abutting edge region (7)
8 overlap region (8)
9 sealing film (9)
10 anode half cell with anode
11 ion-exchange membrane
12 spacer
13 support structure
14 sealing profile
15 anode
Figure 3A:
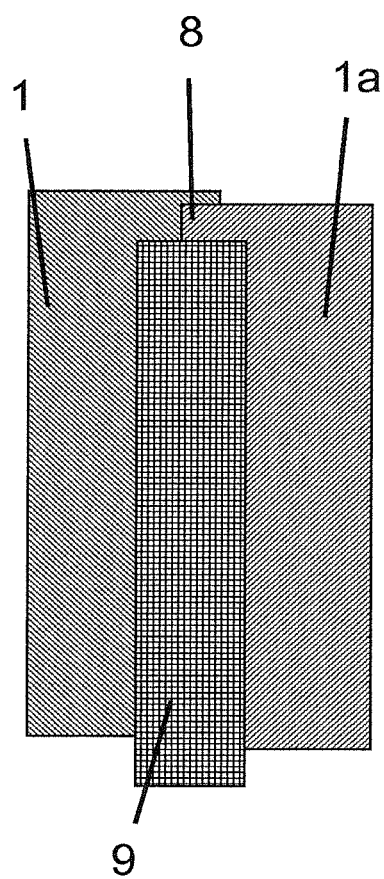

The film 9 also makes it possible to seal, in a manner similar to that described above, creased regions 5 of the oxygen-consuming electrodes 1, 1a occurring at the frame 3 of the gas compartment 4 of the half cell 2 (see FIG. 1) or overlap regions 8 of adjacent oxygen-consuming electrodes 1 and 1a (see FIGS. 3 and 3a) or else cracks in the oxygen-consuming electrode 1a in the cracked region 6 (see FIG. 2a).

The invention claimed is:

1. A method for the gastight and liquid-tight installation of one or more joining oxygen-consuming electrodes in an electrochemical half cell, comprising covering creased regions and/or cracked regions of the oxygen-consuming electrodes and/or abutting edge regions and/or overlap regions of adjacent oxygen-consuming electrodes occurring when the oxygen-consuming electrodes are brought into juxtaposition with a frame of a gas compartment of the cell with an additional film which is thinner than the layer thickness of the oxygen-consuming electrode, and wherein the additional film and the oxygen-consuming electrodes comprises mixtures which, independently of one another, comprise, as catalytically active component, from 70 to 95% by weight of silver oxide, from 0-15% by weight of silver metal powder and from 3-15% by weight of a fluorinated polymer.

2. The method according to claim 1, wherein the additional film has the same catalytically active material as the oxygen-consuming electrode.

3. The method according to claim 1, wherein the additional film and/or the oxygen-consuming electrodes are, independently of one another, based on a fluorinated polymer and a silver-containing catalytically active material.

4. The method according to claim 1, wherein the additional film and/or the oxygen-consuming electrodes are, independently of one another, based on polytetrafluoroethylene (PTFE) and a silver-containing catalytically active material.

5. The method according to claim 4, wherein the catalytically active component in the additional film and/or in the oxygen-consuming electrodes comprises silver, silver(I) oxide, silver(II) oxide, or mixtures thereof.

6. The method according to claim 4, wherein the content of the catalytically active component in the additional film comprises at least 50% by weight of silver oxide.

7. The method according to claim 4, wherein the content of the catalytically active component in the additional film comprises at least 80% by weight of silver oxide.

8. The method according to claim 1, wherein the fluorinated polymer is polytetrafluoroethylene (PTFE).

9. The method according to claim 1, wherein the additional film and the oxygen-consuming electrodes are pressed together after application of the additional film.

10. The method according to claim 1, wherein the additional film and the oxygen-consuming electrodes join together at their contact points after application of the additional film when the cell is started up.

11. The method according to claim 1, wherein the additional film has a layer thickness of from 10 µm to 800 µm.

12. The method according to claim 1, wherein the additional film has a layer thickness of from 50 µm to 600 µm.

13. The method according to claim 1, wherein the oxygen-consuming electrodes have a layer thickness of from 0.1 to 0.8 mm.

14. The method according to claim 1, wherein the oxygen-consuming electrodes have a layer thickness of from 0.2 to 0.7 mm.

15. An electrochemical cell (2) having one or more adjoining oxygen-consuming electrodes, wherein the oxygen-consuming electrodes have creased regions, and/or cracked regions of the oxygen-consuming electrodes and/or abutting edge regions and/or overlap regions of adjacent oxygen-consuming electrodes and occurring upon installation on the frame of the gas compartment of the cell and wherein at least one of these regions are covered with an additional film which has a composition comparable to the oxygen-consuming electrodes and is thinner than the layer thickness of the oxygen-consuming electrode.

16. The electrochemical cell according to claim 15, wherein the oxygen-consuming electrodes comprises a gas diffusion layer which comprises a fluorinated polymer.

17. The electrochemical cell according to claim 15, wherein the oxygen-consuming electrodes and/or the additional film comprises an additional support element which comprises an electrically conductive flexible textile structure.

18. An electrochemical cell obtained by installing the oxygen-consuming electrodes according to the method according to claim 1.

19. A chloralkali electrolysis apparatus comprising the electrochemical cell according to claim 18.

20. The method according to claim 1, wherein the additional film has a layer thickness of from 10 µm to 800 µm and wherein the oxygen-consuming electrodes have a layer thickness of from 0.1 to 0.8 mm.

21. The electrochemical cell according to claim 17, wherein the electrically conductive flexible textile structure is selected from woven nickel mesh, silver mesh or silver-plated nickel mesh.

* * * * *